(12) United States Patent
Jeong et al.

(10) Patent No.: US 8,089,859 B2
(45) Date of Patent: Jan. 3, 2012

(54) DEVICE AND METHOD FOR TRANSMITTING AND RECEIVING PILOT SIGNAL IN WIRELESS COMMUNICATION SYSTEM

(75) Inventors: Byung-Jang Jeong, Daejeon (KR);
Tae-Gyun Noh, Daejeon (KR);
Hyun-Kyu Chung, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 183 days.

(21) Appl. No.: 12/517,777

(22) PCT Filed: Oct. 30, 2007

(86) PCT No.: PCT/KR2007/005406
§ 371 (c)(1),
(2), (4) Date: Jun. 4, 2009

(87) PCT Pub. No.: WO2008/069449
PCT Pub. Date: Jun. 12, 2008

(65) Prior Publication Data
US 2010/0046361 A1 Feb. 25, 2010

(30) Foreign Application Priority Data

Dec. 6, 2006 (KR) .................. 10-2006-0123026
Feb. 26, 2007 (KR) .................. 10-2007-0018976

(51) Int. Cl.
*H04J 11/00* (2006.01)
(52) U.S. Cl. ................................. 370/210; 370/208
(58) Field of Classification Search .......... 370/203–211; 708/200, 400, 403–405; 375/260
See application file for complete search history.

(56) References Cited

U.S. PATENT DOCUMENTS 7,372,910 B2 * 5/2008 Suh et al. .................... 375/260
(Continued)

FOREIGN PATENT DOCUMENTS

KR 1020050048344 A2 5/2005
(Continued)

OTHER PUBLICATIONS

3GPP TR 25.814, "Physical layer aspects for evolved Universal Terrestrial Radio Access (UTRA)," (2006).

(Continued)

*Primary Examiner* — Gary Mui
(74) *Attorney, Agent, or Firm* — Nelson Mullins Riley & Scarborough LLP; EuiHoon Lee, Esq.

(57) ABSTRACT

Disclosed is a pilot signal transmitting/receiving device and method in a wireless communication system. When generating a pilot signal block that is shorter than the length of a data signal, a frequency for each predetermined pilot signal block is transitioned so as to guarantee frequency domain channel estimation performance. A cyclic prefix according to the length of the transitioned pilot signal is added to the pilot signal, a data signal is time division multiplexed together with the pilot signal, and a resultant signal is transmitted through an antenna. In advance to this, a position of a subcarrier for transmitting the pilot signal and the data signal is determined, a data signal is mapped on the determined subcarrier, and in this instance, diversity on the channel for a symbol is used to map the data signal on the transmission method using one of the localized FDMA (L-FDMA) channel and the distributed FDMA (D-FDMA) channel. Therefore, the frequency resolution in the frequency domain is maintained to thus provide high-quality channel estimation performance.

15 Claims, 8 Drawing Sheets

U.S. PATENT DOCUMENTS

| | | | |
|---|---|---|---|
| 2003/0072254 A1 | 4/2003 | Ma et al. | |
| 2005/0105460 A1 | 5/2005 | Suh et al. | |
| 2006/0013325 A1* | 1/2006 | Agrawal et al. | 375/260 |
| 2006/0203932 A1* | 9/2006 | Palanki et al. | 375/295 |
| 2006/0221809 A1* | 10/2006 | Malladi et al. | 370/206 |
| 2006/0268676 A1 | 11/2006 | Gore et al. | |
| 2007/0189404 A1* | 8/2007 | Baum et al. | 375/260 |
| 2007/0291696 A1* | 12/2007 | Zhang et al. | 370/331 |
| 2008/0019314 A1* | 1/2008 | Gorokhov et al. | 370/330 |

FOREIGN PATENT DOCUMENTS

| | | |
|---|---|---|
| KR | 1020060015188 | 2/2006 |
| WO | WO-2006/118411 A2 | 11/2006 |
| WO | 2007/011138 A2 | 1/2007 |

OTHER PUBLICATIONS

Galda, Dirk et al., "A Low Complexity Transmitter Structure for OFDM-FDMA Uplink Systems," *IEEE 55th Vehicular Technology Conference*, vol. 4:1737-1741 (2002).

Gifford, Steve et al., "Broadband OFDM Using 16-bit Precision on a SDR Platform," IEEE Military Communications Conference, Communications for Network-Centric Operations: Creating the Information Force, vol. 1:180-184 (2001).

NTT DoCoMo, "Physical Channels and Multiplexing in Evolved UTRA Uplink," retrieved online at http://www.quintillion.co.jp/3GPP/TSG_RAN/TSG_RAN2005/TSG_RAN_WG1_RL1_6.html (2005).

* cited by examiner

[Fig. 1]
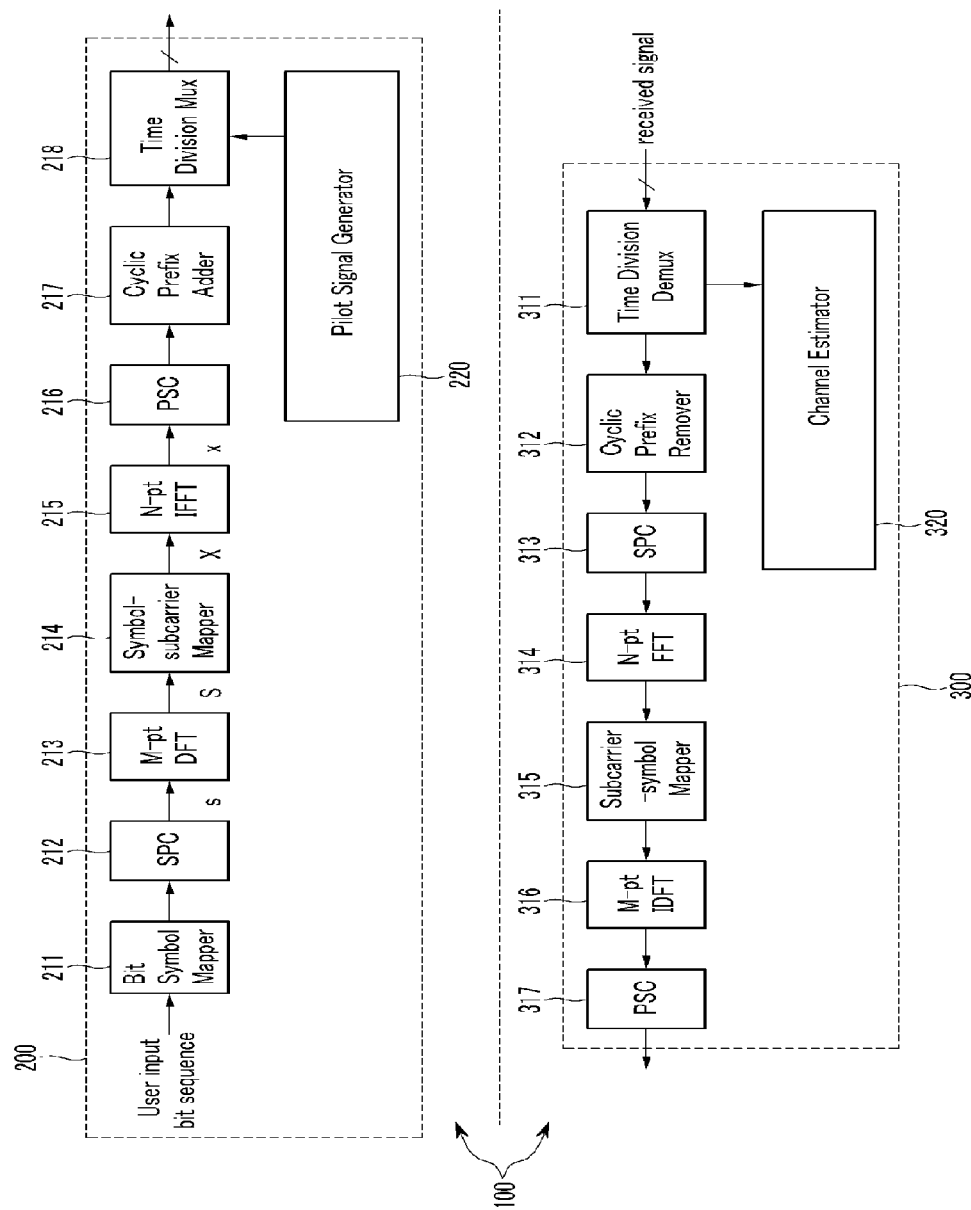

[Fig. 2]
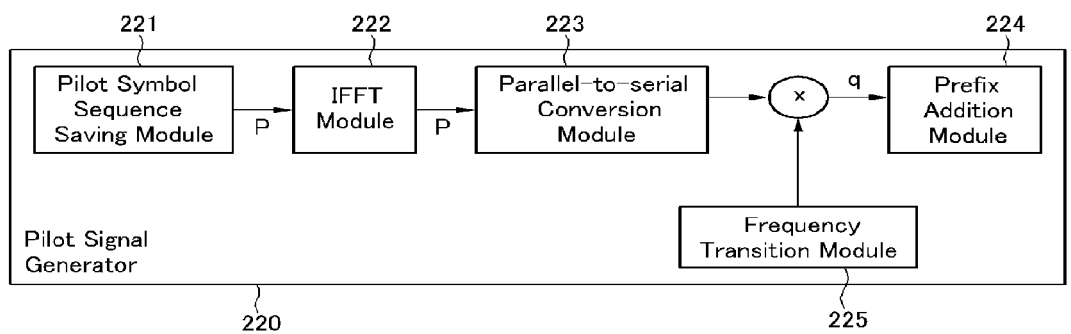

[Fig. 3]
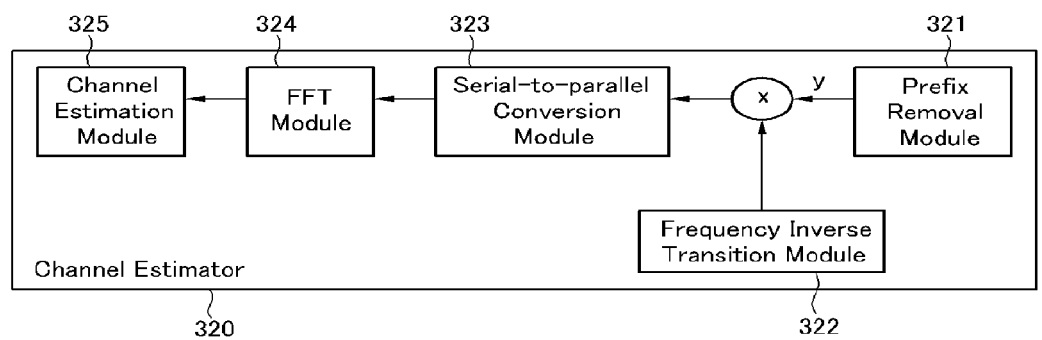

[Fig. 4]
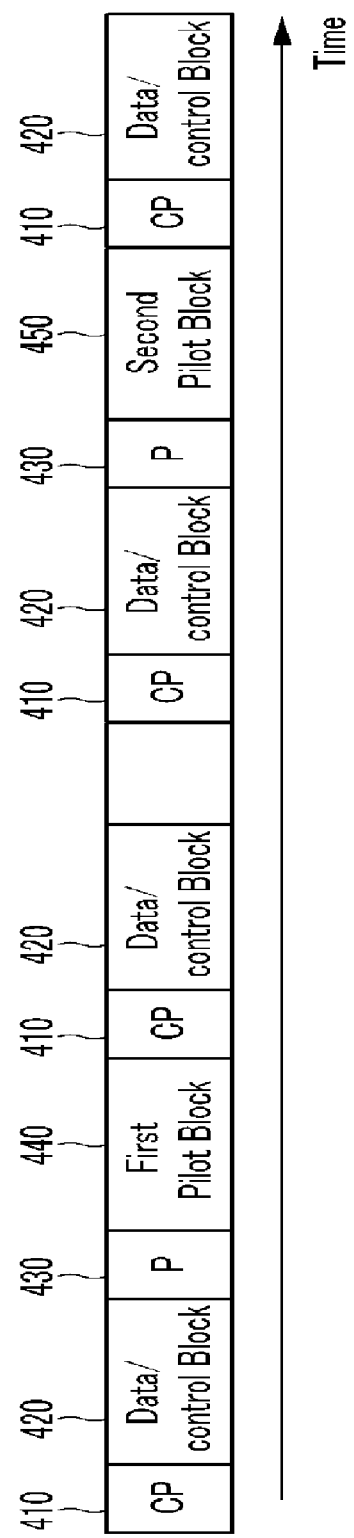

[Fig. 5]
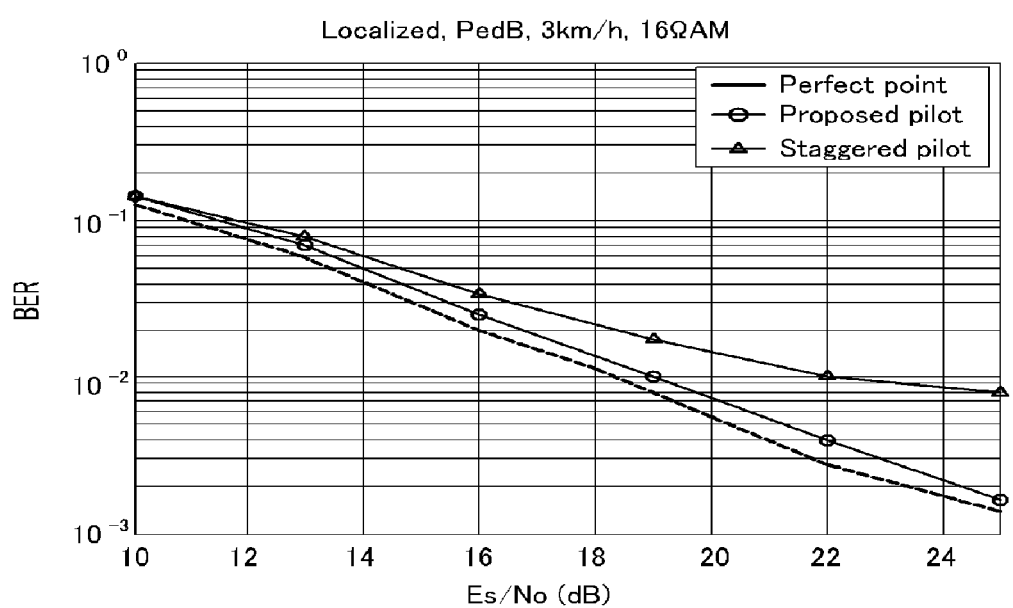

[Fig. 6]
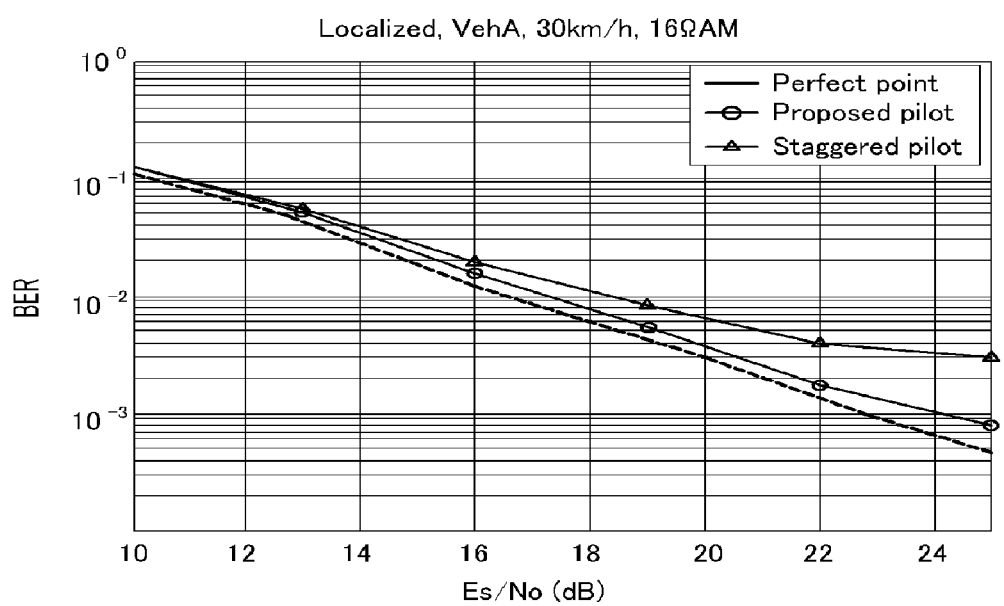

[Fig. 7]
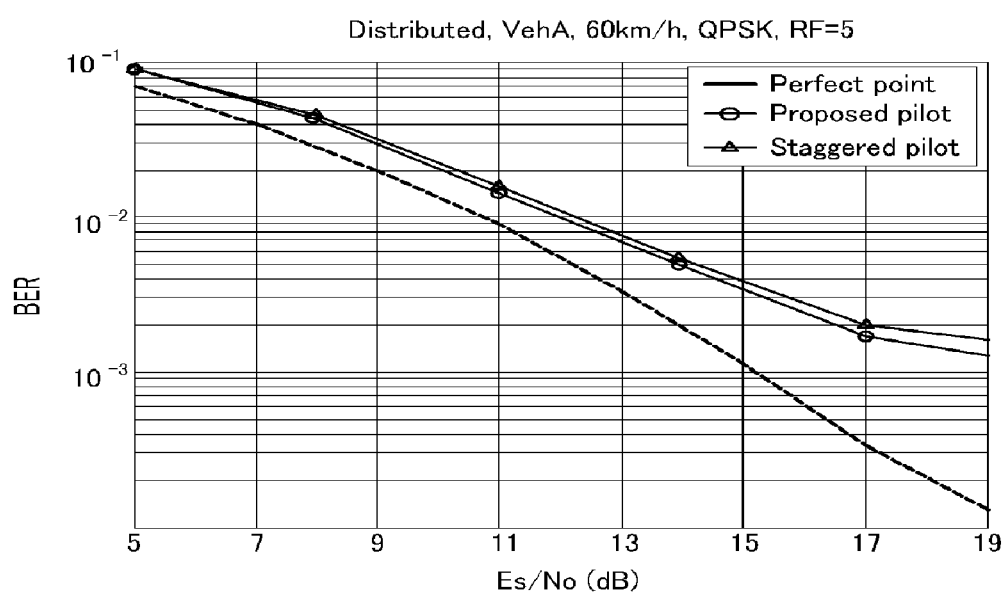

[Fig. 8]
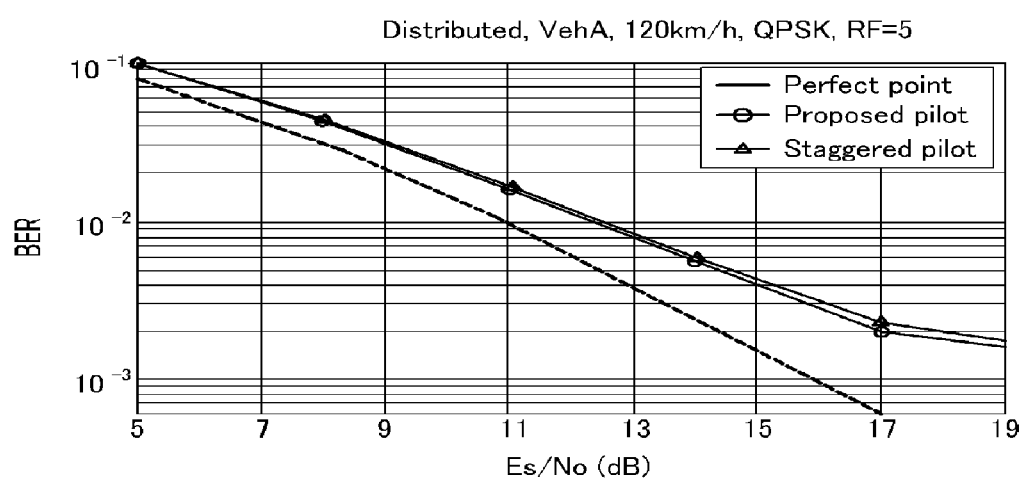

DEVICE AND METHOD FOR TRANSMITTING AND RECEIVING PILOT SIGNAL IN WIRELESS COMMUNICATION SYSTEM

RELATED APPLICATIONS

This application is a 35 U.S.C. §371 national stage filing of PCT Application No. PCT/KR2007/005406 filed on Oct. 30, 2007, which claims priority to, and the benefit of, Korean Patent Application No. 10-2006-0123026, filed on Dec. 6, 2006 and Korean Patent Application No. 10-2007-0018976 filed on Feb. 26, 2007. The contents of the aforementioned applications are hereby incorporated by reference.

TECHNICAL FIELD

The present invention relates to a wireless communication system. More particularly, the present invention relates to a device and method for generating, transmitting, and receiving a pilot signal.

This work was supported by the IT R&D program of MIC/IITA[2006-S-001-01, Development of Adaptive Radio Access and Transmission Technologies for 4th Generation Mobile Communications].

BACKGROUND ART

The orthogonal frequency division multiplexing (OFDM) scheme, which is one of data transmission methods in the wireless communication system, is actively applied to the mobile communication field because of its excellent characteristics.

In general, the OFDM method modulates respective symbol sequences into corresponding subcarriers in the frequency domain and multiplexes them. As the number of subcarriers is increased, the peak-to-average power ratio (PAPR) is also increased. That is, the OFDM method has a characteristic of a high PAPR compared to other types of transmission methods, which is known as the major disadvantage of the OFDM method.

Further, the high PAPR is more disadvantageous in uplink rather than downlink since the high PAPR increases the price of the mobile terminal and reduces the uplink coverage.

To solve the problems, the single carrier frequency division multiple access (SC-FDMA) is proposed, in which an information symbol sequence is digital Fourier transform (DFT) spread, OFDM modulated, and transmitted. In detail, a transmitted signal has a low PAPR in a like manner of the single frequency modulation signal according to an appropriate relationship between the DFT of the preprocessing and the inverse fast Fourier transform (IFFT) of the OFDM modulation process.

However, the low PAPR characteristic of the SC-FDMA transmission signal is to be maintained during the pilot transmission interval as well as during the data transmission interval, and hence the SC-FDMA type of pilot channel is required to consider the low pilot overhead and the low PAPR maintenance in the case of designing the SC-FDMA type pilot channel. That is, in the case of time-division multiplexing the pilot channel and a data channel, it is easy to maintain the low PAPR of the pilot transmission signal, and in the case of the frequency and code division multiplexing, the data signal and the pilot signal are superimposed in the time domain to thus increase the PAPR.

Further, a related prior art is a pilot channel forming method which maintains the low PAPR of the SC-FDMA signal and simultaneously controls the pilot overhead to be not excessive and which is applicable in common to the localized frequency division multiple access (L-FDMA) and the distributed frequency division multiple access (D-FDMA).

However, the pilot channel forming method increases the frequency resolution of the pilot signal compared to the data signal to thus decrease the channel estimation performance.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a pilot signal transmitting/receiving device and method of a wireless communication system having advantages of concurrently supporting a plurality of channels of the frequency division multiple access (FDMA) system and providing quality channel estimation performance.

Technical Solution

In one aspect of the present invention, a pilot signal transmitter includes: a digital Fourier transform unit for digital Fourier transforming a data signal; a pilot signal generator for generating a pilot signal that is transitioned by a predetermined gap in the frequency domain; a time division multiplexer for time division multiplexing the generated pilot signal together with the transformed data signal and transmitting a resultant signal through an antenna; and a symbol-subcarrier mapper for determining a subcarrier for transmitting the generated pilot signal together with the data signal and mapping the data signal on the determined subcarrier.

In another aspect of the present invention, a pilot signal receiver in a wireless communication system includes: a time division demultiplexer for time division demultiplexing a received data signal together with a pilot signal; a fast digital Fourier transform unit for fast Fourier transforming (FFT) the time division demultiplexed data signal; and a channel estimator for estimating the channel by converting the frequency of the time division demultiplexed pilot signal.

In another aspect of the present invention, a pilot signal transmitting method in a wireless communication system includes: digital Fourier transforming a data signal; generating a pilot signal that is transitioned for a predetermined gap in the frequency domain; determining a subcarrier for transmitting the generated pilot signal together with the transformed data signal; mapping the data signal on the determined subcarrier; and time division multiplexing the mapped data signal together with the pilot signal and transmitting a resultant signal through an antenna.

In another aspect of the present invention, a pilot signal receiving method in a wireless communication system includes: time division demultiplexing an external data signal together with a pilot signal; fast Fourier transforming (FFT) the time division demultiplexed data signal; frequency converting the time division demultiplexed pilot signal based on a predetermined phase sequence; and estimating a channel by using the frequency converted pilot signal.

Advantageous Effects

According to the exemplary embodiment of the present invention, excellent channel estimation performance is provided and at least one channel of the SC-FDMA system, that is, the L-FDMA channel and the D-FDMA channel are supported by providing the pilot signal for maintaining the frequency resolution in the frequency domain.

BRIEF DESCRIPTION OF THE DRAWINGS

FIG. 1 shows a pilot signal transmitting/receiving device of a single-carrier frequency division multiple access system according to an exemplary embodiment of the present invention.

FIG. 2 shows a detailed configuration diagram of a pilot signal generator shown in FIG. 1.

FIG. 3 shows a detailed configuration diagram of a channel estimator shown in FIG. 1.

FIG. 4 shows a structure of a frame including a pilot signal according to an exemplary embodiment of the present invention.

FIG. 5, FIG. 6, FIG. 7, and FIG. 8 respectively show SC-FDMA system performance in the case of using a pilot signal according to an exemplary embodiment of the present invention and a general pilot signal.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A pilot signal transmitting/receiving device in the single-carrier frequency division multiple access system will be described hereinafter. The exemplary embodiment of the present invention is applicable to other communication systems as well as the SC-FDMA system.

The pilot signal transmitting/receiving device in the SC-FDMA system will now be described.

FIG. 1 shows a pilot signal transmitting/receiving device of a single-carrier frequency division multiple access system according to an exemplary embodiment of the present invention.

As shown in FIG. 1, the pilot signal transmitting/receiving device 100 includes a transmitting device 200 and a receiving device 300.

In detail, the transmitting device 200 includes a bit-symbol mapper 211, a serial-to-parallel converter 212, a first digital Fourier transform unit 213, a symbol-subcarrier mapper 214, a first inverse fast digital Fourier transform unit 215, a parallel-to-serial converter 216, a cyclic prefix adder 217, a time division multiplexer 218, and a pilot signal generator 220. The first digital Fourier transform unit 213 will be exemplified to use an M-pt digital Fourier transform unit, and the first inverse fast digital Fourier transform unit 215 will be exemplified to use an N-put inverse fast digital Fourier transform unit.

FIG. 2 shows a detailed configuration diagram of a pilot signal generator 220 in the pilot signal transmitting device 200.

As shown in FIG. 2, the pilot signal generator 220 includes a pilot symbol saving module 221, an inverse fast digital Fourier transform module (or IFFT module) 222, a parallel-to-serial conversion module 223, a prefix addition module 224, and a frequency transition module 225. Here, the inverse fast digital Fourier transform module 222 will be exemplified by an N/B-pt inverse fast digital Fourier transform unit.

As shown in FIG. 1, the receiving device 300 includes a time division demultiplexer 311, a cyclic prefix remover 312, a serial-to-parallel converter 313, a second digital Fourier transform unit 314, a subcarrier-symbol mapper 315, a second inverse fast digital Fourier transform unit 316, a parallel-to-serial converter 317, and a channel estimator 320. In this instance, the second digital Fourier transform unit 314 will be described with reference to an N-pt digital Fourier transform unit and the second inverse fast digital Fourier transform unit 316 will be described with reference to an M-pt inverse fast digital Fourier transform unit.

FIG. 3 shows a detailed configuration diagram of a channel estimator 320 in the pilot signal receiving device 300.

As shown in FIG. 3, the channel estimator 320 includes a prefix removal module 321, a frequency inverse transition module 322, a serial-to-parallel conversion module 323, a digital Fourier transform module (or a FFT module) 324, and a channel estimation module 325. In this instance, the digital Fourier transform module 324 will be described with reference to an N/B-pt digital Fourier transform unit.

Regarding the pilot signal transmitting device 200, the bit-symbol mapper 211 converts an externally input user bit sequence into a symbol sequence, and the serial-to-parallel converter 212 generates the converted symbol sequence into M symbol sequences in parallel.

The first digital Fourier transform unit 213 uses the M-pt digital Fourier transform unit so as to apply digital Fourier transform to the M symbol sequences, and the symbol-subcarrier mapper 214 determines the position of the subcarrier for transmitting the fast Fourier transformed (FFT) symbol sequence together with the pilot signal to be generated to the receiving device 300.

The first inverse fast digital Fourier transform unit 215 performs inverse fast digital Fourier transform on the symbol sequence with the determined transmission position, and the parallel-to-serial converter 216 converts the inverse fast digital Fourier transformed symbol sequence into a serial symbol sequence. The cyclic prefix adder 217 adds a cyclic prefix to the serial symbol sequence.

The time division multiplexer 218 time division multiplexes the symbol sequence to which the cyclic prefix is added, that is, the data signal together with the pilot signal according to the exemplary embodiment of the present invention, and transmits a resultant signal to the receiving device 300 through an antenna.

The inverse fast digital Fourier transform module 222 of the pilot signal generator 220 performs inverse fast digital Fourier transform on a stored pilot symbol sequence in the pilot symbol sequence saving module 221 (i.e., a pilot signal), and the parallel-to-serial conversion module 223 converts the pilot symbol sequence into a serial pilot symbol sequence.

The frequency transition module 225 transitions the serial pilot symbol sequence for a predetermined interval in the frequency domain, and the prefix addition module 224 adds a cyclic prefix in consideration of the length of the transitioned pilot symbol sequence.

The time division demultiplexer 311 of the pilot signal receiving device 300 time division demultiplexes the data signal externally received through the antenna together with the pilot signal, and the cyclic prefix remover 312 removes the cyclic prefix from the demultiplexed data signal.

The serial-to-parallel parallel converter 313 converts the cyclic prefix removed data signal into parallel data signal, and the second digital Fourier transform unit 314 digital Fourier transforms the parallel data signal.

The subcarrier-symbol mapper 315 maps the converted data signal on the corresponding symbol sequence, the second inverse fast digital Fourier transform unit 316 inverse fast digital Fourier transforms the mapped data signal, and the parallel-to-serial converter 317 converts the data signal into a serial data signal.

The prefix removal module 321 of the channel estimator 320 removes the prefix from the time division demultiplexed pilot signal, and the frequency inverse transition module 322 performs frequency conversion on the prefix removed pilot signal based on a predetermined phase sequence. A detailed conversion process will be described later.

The serial-to-parallel conversion module 323 converts the frequency converted pilot signal into a parallel pilot signal, the digital Fourier transform module 324 digital Fourier transforms the parallel pilot signal. The channel estimation module 325 estimates the channel by using the transformed pilot signal.

The above-noted pilot signal transmitting/receiving device 100 will now be described.

An operation of the pilot signal transmitting device 200 will now be described.

The bit-symbol mapper 211 converts the externally input user bit sequence into a symbol sequence, and the serial-to-parallel converter 212 converts the converted symbol sequence into M parallel symbol sequences. The first digital Fourier transform unit 213 digital Fourier transforms the M symbol sequences to spread the same and mix signals to the same.

In addition, the digital Fourier transform process can be omitted, and in this case, the system represents the orthogonal frequency division multiplex access (OFDMA) system. The OFDMA system has a high peak-to-average power ratio (PAPR) compared to other transmission methods. Therefore, the SC-FDMA system digital Fourier transforms the corresponding symbol sequence so as to reduce the PAPR.

The symbol-subcarrier mapper 214 determines the position of the subcarrier for transmitting the fast Fourier transformed (FFT) symbol sequence together with the pilot signal to be generated to the receiving device 300. In this instance, when the symbol-subcarrier mapper 214 allocates the corresponding symbol sequence to the adjacent subcarrier, it is a localized-frequency division multiple access (L-FDMA) channel, and when the symbol-subcarrier mapper 214 allocates the corresponding symbol sequence to the distribution subcarriers with equal intervals, it is a distributed-frequency division multiple access (D-FDMA) channel.

Accordingly, the pilot signal transmitting/receiving device 100 provides the pilot signal for supporting the L-FDMA channel and the D-FDMA channel in common, and the embodiment of the present invention can support other channels.

The first inverse fast digital Fourier transform unit 215 inverse fast digital Fourier transforms the symbol sequence $\{X_k, k=k_0, k_1, L, k_{M-1}\}$ with the determined transmission position into $\{x_n, n=0, 1, L, N-1\}$, as expressed in Equation 1.

$$x_n = \sum_{k=k_0}^{k_{M-1}} X_k \cdot e^{j2\pi nk/N} \quad \text{(Equation 1)}$$

Here, the position of the symbol sequence $\{k=k_0, k_1, \ldots, k_{M-1}\}$ is $\{k=1, 1+1, \ldots, 1+M-1\}$ since the L-FDMA channel has M adjacent subcarriers, and the same is $\{k=1, 1+Q, \ldots, 1+(M-1)Q\}$ in the case of the D-FDMA channel. Also, l is a constant, and Q is an interval between the subcarriers that are distributed at regular intervals in the D-FDMA channel.

The parallel-to-serial converter 216 converts the inverse fast digital Fourier transformed symbol sequence into a serial symbol sequence, and the cyclic prefix adder 217 adds a cyclic prefix to the serial symbol sequence. Further, the SC-FDMA system 100 adds a cyclic prefix before the data signal so as to prevent the data signal that is delayed through a multipath from generating self-interference.

The time division multiplexer 218 time division multiplexes the cyclic prefix added symbol sequence, that is, the data signal together with the pilot signal to be generated, and transmits a resultant signal to the receiving device 300 through the antenna. Hence, the time division multiplexer 218 time division multiplexes the pilot signal and the data signal so as to easily maintain the low PAPR of the pilot signal.

A pilot signal generation process according to an exemplary embodiment of the present invention will now be described.

The inverse fast digital Fourier transform module 222 inverse fast digital Fourier transforms the stored pilot symbol sequence in the pilot symbol sequence saving module 221, and the parallel-to-serial conversion module 223 converts the transformed pilot symbol sequence into a serial pilot symbol sequence.

Further, the pilot signal transmitting device 200 uses the constant amplitude zero auto-correlation (CAZAC) signal, which has a good PAPR characteristic and is advantageous for channel estimation, for the pilot symbol sequence. The embodiment of the present invention can use another signal sequence for the pilot symbol sequence.

The entire length of the pilot symbol sequence is configured to have a length that is shorter than that of the above-noted user input bit. That is, regarding the first inverse fast digital Fourier transform unit 215 and the third inverse fast digital Fourier transform module 222, the N-pt IFFT is applied to the data block, and the (N/B)-pt IFFT is applied to the pilot block since the length of the pilot block is configured to be shorter than that of the general data block by 1/B.

The prefix addition module 224 adds a prefix to the serial pilot symbol sequence by considering the length of the pilot symbol sequence that is transitioned by a pre-determined gap in the frequency domain, which will now be described.

The pilot signal $$\{q_0^b, q_1^b, \ldots, q_{N/B-1}^b\}$$

generated by the pilot signal generator 220 is expressed in Equation 2.

$$q_n^b = p_n \cdot \Phi_n^b \quad \text{(Equation 2)}$$
$$= \left(\sum_{k=0}^{N/B-1} P_k \cdot e^{j2\pi nk/N}\right) \cdot \Phi_n^b,$$
$$n \in \{0, 1, \ldots, N/B-1\}, b \in \{1, 2, \ldots, B\}$$

In the case of generating the pilot signal $$\{q_0^b, q_1^b, \ldots, q_{N/B-1}^b\},$$

the pilot signal generator 220 does not need to generate and transmit the pilot signal to all data signals $b \in \{1, 2, \ldots, B\}$, and can generate and transmit the pilot signal for a predetermined data signal (b) depending on the case.

The pilot signal generator 220 can configure the phase transition sequence $$\Phi_n^b$$

of Equation 2 as shown in Equation 3.

$$\Phi_n^b = e^{j2\pi n(b-1)/N} \quad \text{(Equation 3)}$$

In detail, the operation of the pilot signal transmitting device 200 when the data signal to be transmitted to the pilot signal receiving device 300, that is, the data block is 2 (B=2), will now be described.

The first pilot transmission block generates no frequency transition since the first pilot transmission block is given as $$\Phi^1_n = 1$$

for all $n \in \{0, 1, \ldots, N/2-1\}$.

However, the position of the pilot in the second pilot transmission block is transitioned by a subcarrier by $$\phi_n^b = e^{j2\pi n(b-1)/N}$$

in the frequency domain.

The prefix addition module 224 adds a prefix so as to maintain the orthogonality between the subcarriers in the case of transmitting the pilot signal in a like manner of data signal transmission. In the case of addition, the prefix addition module 224 adds a prefix in a modified format in consideration of the shortened length of the pilot transmission block, differing from the case of adding a cyclic prefix in the general data block.

That is, when the length of the prefix is given as L and the position of the prefix for each transmission block is given as $-L \leq n \leq -1$, the prefix addition module 224 configures the prefix of each pilot transmission block $$q^b_n$$

as expressed in Equation 4.

$$q^b_n = p_{n+N/B} \cdot \Phi^b_{n+N}, \; n \in \{-L, -(L-1), \ldots, -1\} \quad \text{(Equation 4)}$$

When B is given to be 2 in Equation 4, it is satisfied that $$q^1_n = p_{n+N/2} = q^1_{n+N/2}, \; n \in \{-L, -(L-1), \ldots, -1\}$$

and $$q^2_n = -p_{n+N/2} \cdot \Phi^2_{n+N/2} = -q^2_{n+N/2}, \; n \in \{-L, -(L-1), \ldots, -1\}.$$

Accordingly, the prefix of the first pilot transmission block $$q^1_n$$

becomes equal to the general cyclic prefix and the prefix of the second pilot transmission block $$q^2_n$$

is a cyclic prefix generated by inverting the phase thereof.

Hence, the prefix addition module 224 maintains the frequency resolution of the frequency domain and provides high-quality channel estimation performance by adding the cyclic prefix that has considered the length of the pilot signal transitioned by a predetermined gap in the frequency domain to the pilot signal. An example of the cyclic prefix added to the corresponding signal is shown in FIG. 4.

FIG. 4 shows a structure of a frame including a pilot signal according to an exemplary embodiment of the present invention.

As shown in FIG. 4, a data/control block 420 has a time division multiplexed structure with a pilot block 440, a general cyclic prefix 410 is added to the data/control a block 420, and the pilot block 440 has a structure to which a phase inverted cyclic prefix 430 is added.

An operation of the pilot signal receiving device 300 according to an exemplary embodiment of the present invention will now be described.

The pilot signal received by the time division demultiplexer 311 of the pilot signal receiving device 300 from a time division multiplexer 218 of the pilot signal transmitting device 200 is expressed in Equation 5.

$$\begin{bmatrix} y_0 \\ y_1 \\ \vdots \\ y_{L-1} \\ \vdots \\ y_{N/2-1} \end{bmatrix} = \underbrace{\begin{bmatrix} h_0 & 0 & \cdots & h_{L-1} & \cdots & h_1 \\ h_1 & h_0 & \ddots & 0 & \ddots & \vdots \\ \vdots & h_1 & \ddots & \ddots & \ddots & h_{L-1} \\ h_{L-1} & \ddots & \ddots & h_0 & \ddots & 0 \\ \vdots & h_{L-1} & \ddots & h_1 & \ddots & \vdots \\ 0 & 0 & \cdots & \vdots & \cdots & h_0 \end{bmatrix}}_{\text{cyclic matrix}} \begin{bmatrix} q^1_0 \\ q^1_1 \\ \vdots \\ q^1_{L-1} \\ \vdots \\ q^1_{N/2-1} \end{bmatrix} + \begin{bmatrix} \eta_0 \\ \eta_1 \\ \vdots \\ \eta_{L-1} \\ \vdots \\ \eta_{N/2-1} \end{bmatrix} \quad \text{(Equation 5)}$$

$$\begin{bmatrix} y_0 \\ y_1 \\ \vdots \\ y_{L-1} \\ \vdots \\ y_{N/2-1} \end{bmatrix} = \underbrace{\begin{bmatrix} h_0 & 0 & \cdots & -h_{L-1} & \cdots & -h_1 \\ h_1 & h_0 & \ddots & 0 & \ddots & \vdots \\ \vdots & h_1 & \ddots & \ddots & \ddots & -h_{L-1} \\ h_{L-1} & \ddots & \ddots & h_0 & \ddots & 0 \\ \vdots & h_{L-1} & \ddots & h_1 & \ddots & \vdots \\ 0 & 0 & \cdots & \vdots & \cdots & h_0 \end{bmatrix}}_{\text{non-cyclic matrix}} \begin{bmatrix} q^2_0 \\ q^2_1 \\ \vdots \\ q^2_{L-1} \\ \vdots \\ q^2_{N/2-1} \end{bmatrix} + \begin{bmatrix} \eta_0 \\ \eta_1 \\ \vdots \\ \eta_{L-1} \\ \vdots \\ \eta_{N/2-1} \end{bmatrix}$$

$$y = \tilde{H} q^b + \eta$$

As can be known from Equation 5, the first pilot transmission block maintains the orthogonality between the subcarriers in the frequency domain as a channel matrix becomes an acyclic matrix in a like manner of the case of transmitting the data block.

The second pilot transmission block does not have a cyclic channel matrix because of the influence by the phase-inverted cyclic prefix. That is, a general receiving device does not guarantee orthogonality between the subcarriers for the second pilot transmission block.

However, the pilot signal receiving device 300 according to an exemplary embodiment of the present invention will overcome the above-noted problem by using the structure shown in FIG. 3.

First, the operations from the time division demultiplexer 311 to the parallel-to-serial converter 317 of the pilot receiving device 300 are reverse processes of the operations from the serial-to-parallel converter 212 to the time division multiplexer 218 of the transmitting device 200, and are general data signal receiving processes.

A pilot signal receiving process according to an exemplary embodiment of the present invention will now be described.

The prefix removal module 321 removes the prefix from the pilot signal received from the transmitting device 200, and the frequency inverse transition module 322 multiplies the prefix-removed pilot signal by the phase transition sequence $$(\Phi_n^b)^*$$

to perform frequency conversion. The notation $$(\cdot)^*$$

in the phase transition sequence represents a complex conjugate, which is expressed in Equation 6.

$$\begin{aligned}\Phi^{b*}y &= \Phi^{b*}\tilde{H}q^b + \Phi^{b*}\eta \\ &= \Phi^{b*}\tilde{H}\Phi^b p + \Phi^{b*}\eta \\ &= Hp + \Phi^{b*}\eta\end{aligned} \qquad \text{(Equation 6)}$$

The modified channel matrix H of the third equality in Equation 6 is a cyclic matrix for all b ∈ {1, 2, . . . , B}. The above process has been described based on the case in which the data block B is given 2, which is for ease of description, and the process satisfies all the B values.

The serial-to-parallel conversion module 323 converts the phase-transitioned pilot signal into a parallel pilot signal, and the digital Fourier transform module 324 digital Fourier transforms the parallel pilot signal to spread the same to be mixed. The channel estimation module 325 extracts the pilot signal from the digital Fourier transformed signal, and estimates the channel by using the extracted pilot signal. According to the estimation result, further stable channel estimation performance is provided.

That is, the pilot signal transmitting/receiving device provides the pilot signal for maintaining the frequency resolution in the frequency domain to allow provision of excellent channel estimation performance when using the general pilot signal, for example a staggered pilot signal. An example on the per-signal channel estimation performance is shown in FIG. 5 and FIG. 6.

FIG. 5, FIG. 6, FIG. 7, and FIG. 8 respectively show SC-FDMA system performance in the case of using a pilot signal according to an exemplary embodiment of the present invention and a general pilot signal.

For reference, the comparison method uses the perfect channel estimation case in which the channels for all the subcarriers are known, and the pilot signal that is considered by 3GPP LTE. The channel estimation in the case of using the pilot signal and the staggered pilot signal pilot is performed by the least squares method for the subcarriers at which all the pilots are positioned, and the same is performed for the residual subcarriers through linear interpolation in the frequency and time domain.

In detail, FIG. 5 and FIG. 6 use the 16 QAM for the performance curved line in the L-FDMA channel transmission, and the speed of the terminal in FIG. 5 is 3 km/h and the speed thereof in FIG. 6 is 30 km/h. As can be known from the drawings, the application of the pilot signal according to an exemplary embodiment of the present invention outperforms the case of using the staggered pilot signal.

FIG. 7 and FIG. 8 use the QPSK for the performance curved line in the D-FDMA channel transmission, and the speed of the terminal in FIG. 7 is 60 km/h and the speed of the terminal in FIG. 8 is 120 km/h. As can be known from the drawings, the application of the pilot signal according to an exemplary embodiment of the present invention provides a little better performance compared to the staggered pilot signal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A pilot signal transmitter comprising:
   a digital Fourier transform unit for digital Fourier transforming a data signal;
   a pilot signal generator for generating a pilot signal that is transitioned by a predetermined gap in the frequency domain;
   a time division multiplexer for time division multiplexing the generated pilot signal together with the transformed data signal, and transmitting a resultant signal through an antenna; and
   a symbol-subcarrier mapper for determining a subcarrier for transmitting the generated pilot signal together with the data signal, and mapping the data signal on the determined subcarrier.

2. The pilot signal transmitter of claim 1, wherein the symbol-subcarrier mapper maps the data signal on one of a localized-frequency division multiple access channel and a distributed-frequency division multiple access channel.

3. The pilot signal transmitter of claim 1, wherein the pilot signal generator includes:
   an inverse fast digital Fourier transform module for inverse fast digital Fourier transforming the pilot signal;
   a frequency transition module for transitioning the inverse fast digital Fourier transformed pilot signal by a predetermined gap in the frequency domain; and
   a prefix addition module for adding a cyclic prefix to the pilot signal by considering the length of the transitioned pilot signal.

4. The pilot signal transmitter of claim 3, wherein the prefix addition module adds a phase inverted cyclic prefix to the pilot signal.

5. The pilot signal transmitter of claim 3, wherein the inverse fast digital Fourier transform module transforms the pilot signal that is set to be shorter than the length of the data signal.

6. The pilot signal transmitter of claim 1, wherein the pilot signal includes a constant amplitude zero autocorrelation (CAZAC) signal.

7. A pilot signal receiver comprising:
   a time division demultiplexer for time division demultiplexing a received data signal together with a pilot signal;
   a fast digital Fourier transform unit for fast Fourier transforming (FFT) the time division demultiplexed data signal; and
   a channel estimator for estimating the channel by converting the frequency of the time division demultiplexed pilot signal,
   wherein the channel estimator comprises a frequency inverse transition module for performing frequency conversion on the time division demultiplexed pilot signal based on a predetermined phase sequence.

8. The pilot signal receiver of claim 7, wherein the channel estimator includes:
   a prefix removal module for removing a prefix from the time division demultiplexed pilot signal;
   a frequency inverse transition module for performing frequency conversion on the prefix removed pilot signal based on a predetermined phase sequence; and
   a channel estimation module for estimating the channel by using the frequency converted pilot signal.

9. A pilot signal transmitting method comprising:
digital Fourier transforming a data signal;
generating a pilot signal that is transitioned for a predetermined gap in the frequency domain;
determining a subcarrier for transmitting the generated pilot signal together with the transformed data signal;
mapping the data signal on the determined subcarrier; and
time division multiplexing the mapped data signal together with the pilot signal, and transmitting a resultant signal through an antenna.

10. The pilot signal transmitting method of claim 9, wherein
the mapping of the data signal on the subcarrier includes
mapping the data signal on one of the localized-frequency division multiple access channel and the distributed-frequency division multiple access channel.

11. The pilot signal transmitting method of claim 9, wherein
the generation of the pilot signal includes:
inverse fast digital Fourier transforming the pilot signal;
transitioning the inverse fast digital Fourier transformed pilot signal for a predetermined gap in the frequency domain; and
adding a cyclic prefix to the pilot signal in consideration of the length of the transitioned pilot signal.

12. The pilot signal transmitting method of claim 11, wherein
the generation of the pilot signal includes:
forming the pilot signal as given in a pilot symbol sequence and a phase transition sequence; and
forming a phase transition sequence is the transitioning of the pilot signal in the frequency domain includes transitioning the pilot signal for a predetermined gap based on the formed phase transition sequence.

13. The pilot signal transmitting method of claim 11, wherein
the adding of the cyclic prefix includes adding the cyclic prefix according to the length of the pilot signal by forming the cyclic prefix as given the pilot symbol sequence and the phase transition sequence.

14. The pilot signal transmitting method of claim 9, further comprising
controlling the length of the pilot signal to be shorter than the length of the data signal, and
the generation of the pilot signal includes generating the pilot signal by transitioning the short pilot signal for a predetermined gap in the frequency domain.

15. A pilot signal receiving method comprising:
time division demultiplexing an external data signal together with a pilot signal;
fast Fourier transforming (FFT) the time division demultiplexed data signal;
frequency converting the time division demultiplexed pilot signal based on a predetermined phase sequence; and
estimating a channel by using the frequency converted pilot signal.

* * * * *